United States Patent [19]
Bertin

[11] 3,756,542
[45] Sept. 4, 1973

[54] AIRCRAFT HAVING AN AUXILIARY LIFT DEVICE

[75] Inventor: Jean Henri Bertin, Neuilly-sur-Seine, France

[73] Assignee: Bertin & Cie, Plaisir, France

[22] Filed: May 3, 1971

[21] Appl. No.: 139,550

[30] Foreign Application Priority Data
May 4, 1970 France .................. 7016228

[52] U.S. Cl. ................ 244/42 CC, 60/230, 244/15
[51] Int. Cl. ................................................ B64c 3/38
[58] Field of Search ............ 244/12, 15, 23, 42 CC, 244/52, 53, 73; 239/265.17, 265.19; 60/230, 231, 232, 271; 181/62

[56] References Cited
UNITED STATES PATENTS

| | | | |
|---|---|---|---|
| 2,891,740 | 6/1959 | Campbell | 244/15 |
| 2,973,922 | 3/1961 | Davidson et al. | 244/15 |
| 2,987,136 | 6/1961 | Lilley et al. | 181/62 |
| 3,133,412 | 5/1964 | Westley | 60/230 |
| 3,154,267 | 10/1964 | Grant | 244/73 R |
| 3,326,500 | 6/1967 | Lanier | 244/42 D |
| 3,532,129 | 10/1970 | Ward et al. | 244/53 B |
| 3,579,993 | 5/1971 | Tanner | 60/271 |

*Primary Examiner*—Milton Buchler
*Assistant Examiner*—Jesus D. Sotelo
*Attorney*—Alfred W. Breiner

[57] ABSTRACT

An aircraft has at the trailing edge of its wing a lift-augmenter flap towards which there can be directed, in the maximum lift configuration, a fluid stream elongated in the wing span direction and produced by a flat fish-tail jet nozzle disposed below the wing undersurface forwards of and near the lift-augmenter flap, so as to increase the lift by deflection of the elongated fluid stream with a correct flow adhesion of the fluid over the upper surface of the flap. The fish-tail nozzle is subdivided into elementary nozzles producing as many elementary streams of motive gases which contribute to jet propulsion; these elementary nozzles are in the form of slots extending parallel to one another, in the wing span direction and/or right-angles thereto.

17 Claims, 17 Drawing Figures

PATENTED SEP 4 1973 3,756,542
SHEET 1 OF 6
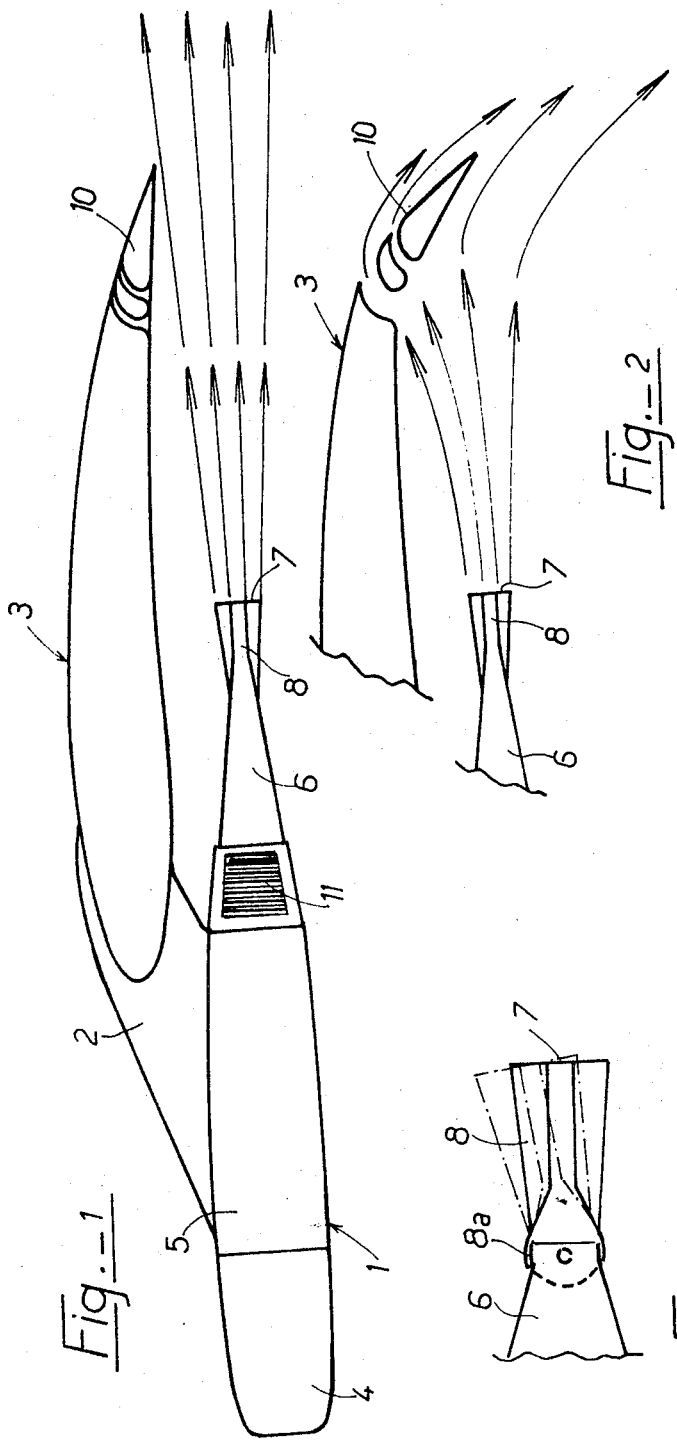
Fig.-1
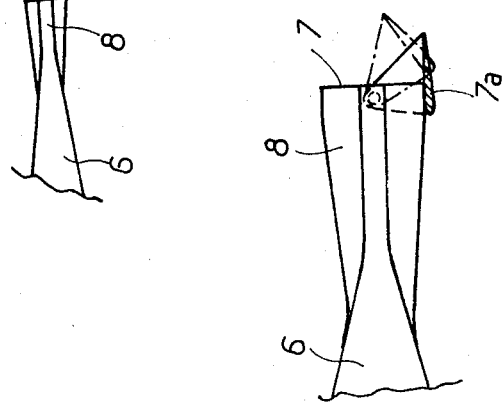
Fig.-2
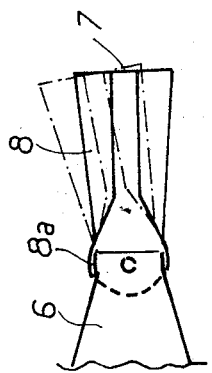
Fig.-3
Fig.-4

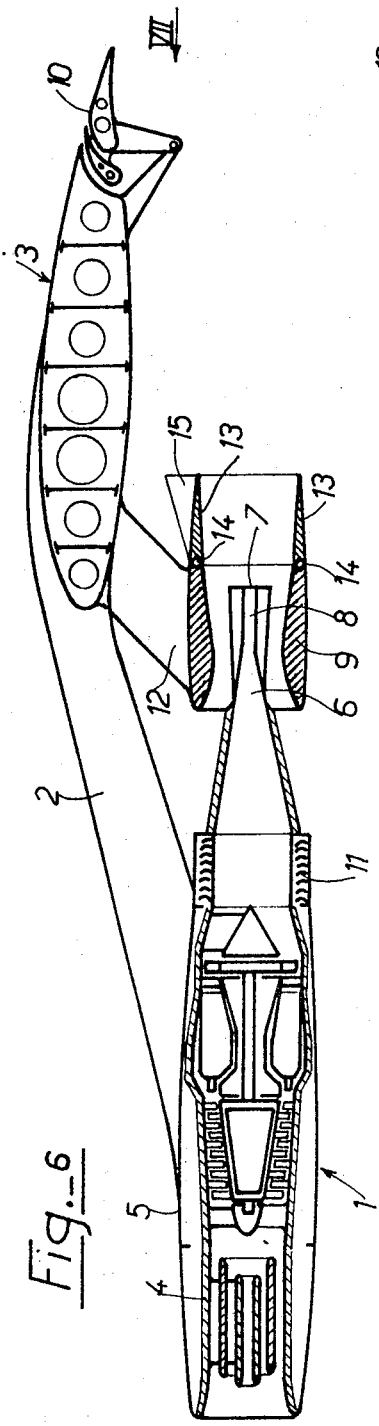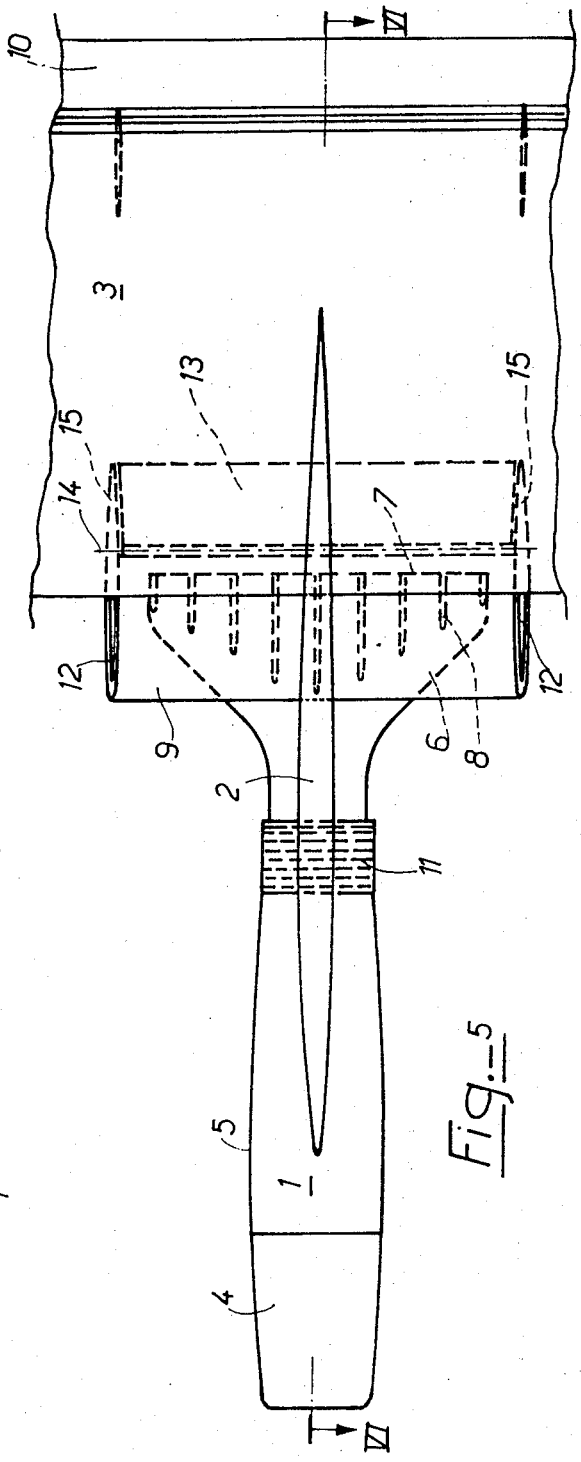
Fig.-6
Fig.-5

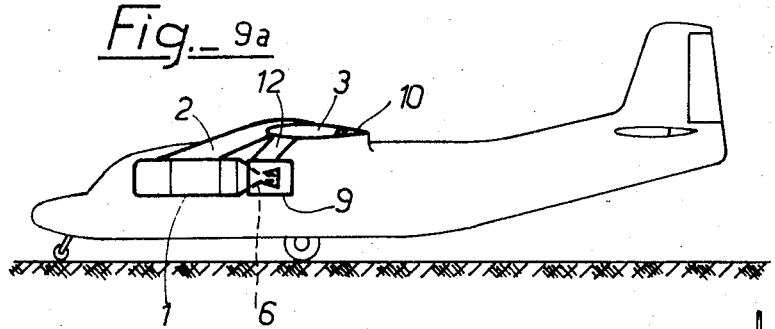
Fig._9a
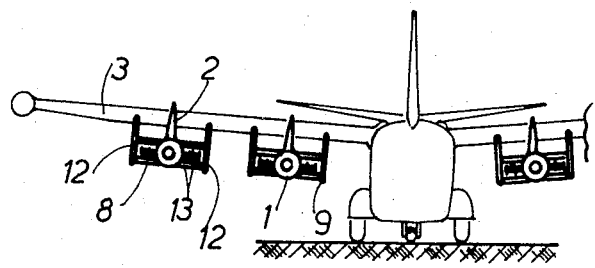
Fig._9c
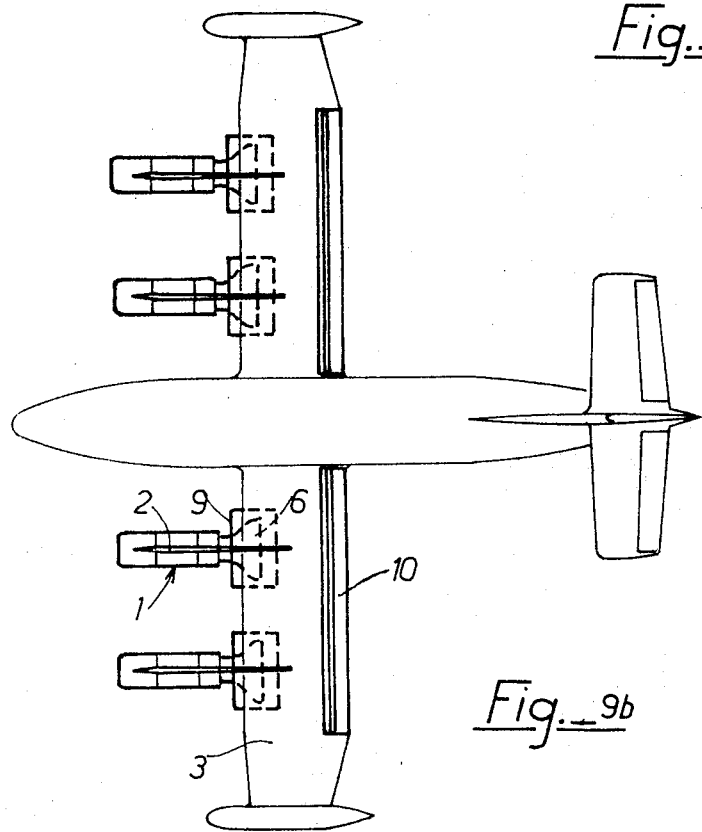
Fig._9b

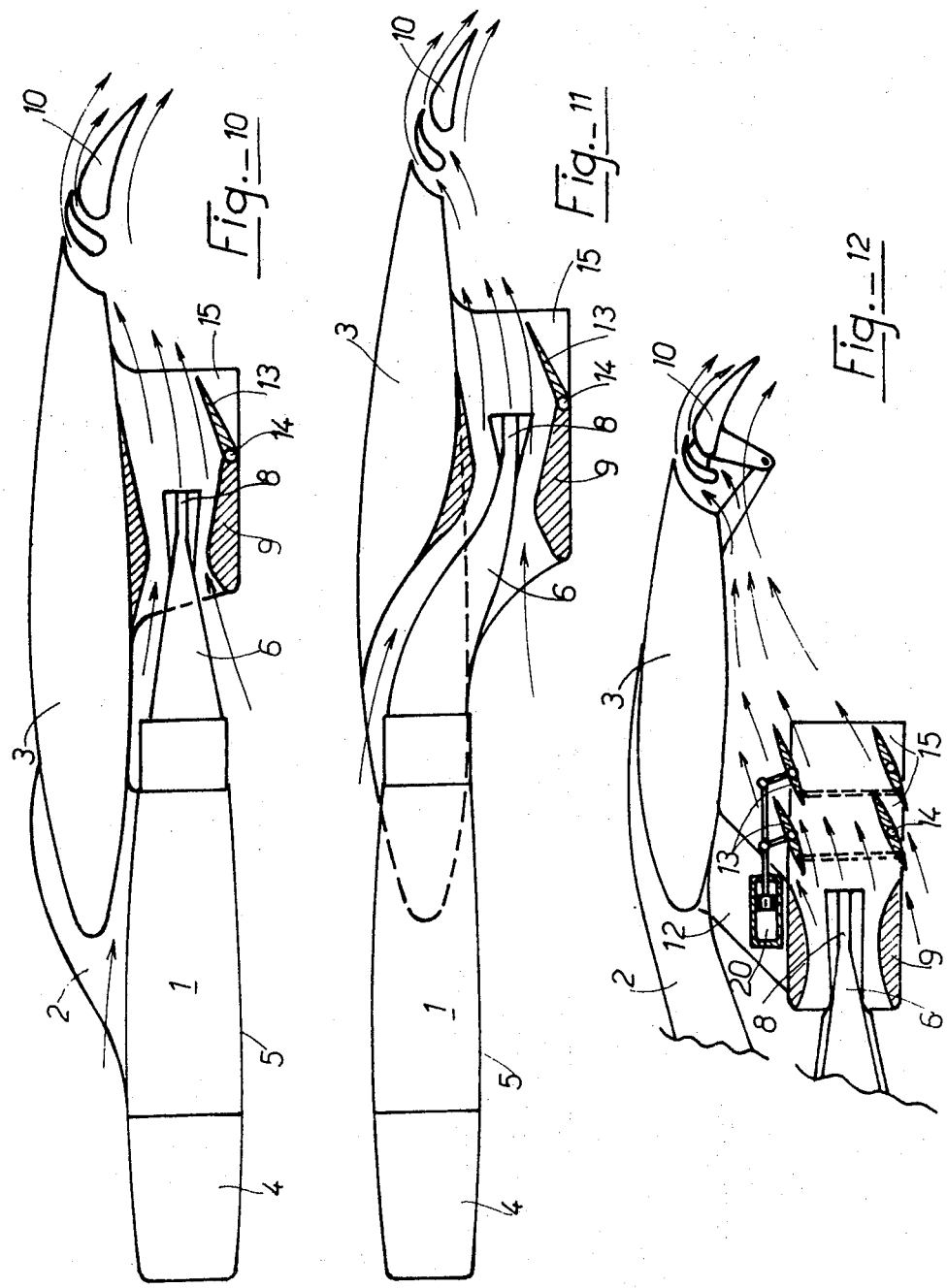

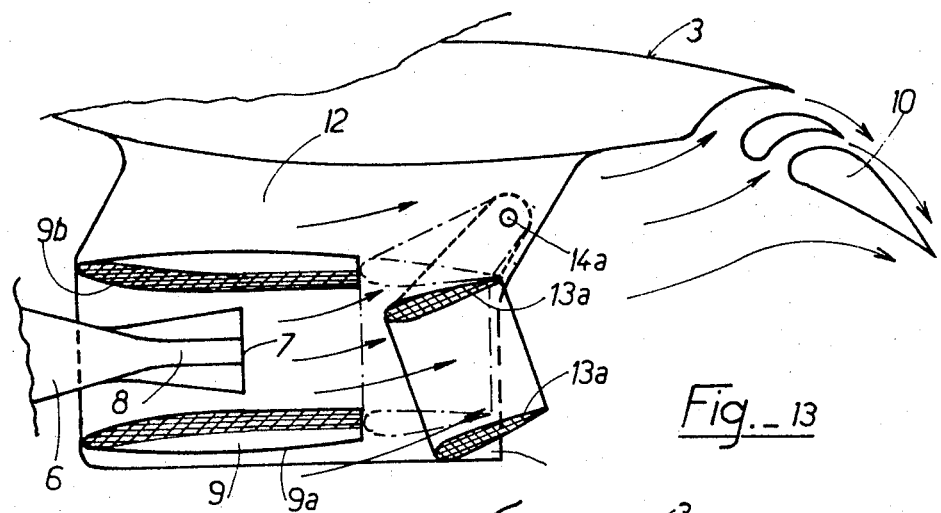
Fig.—13
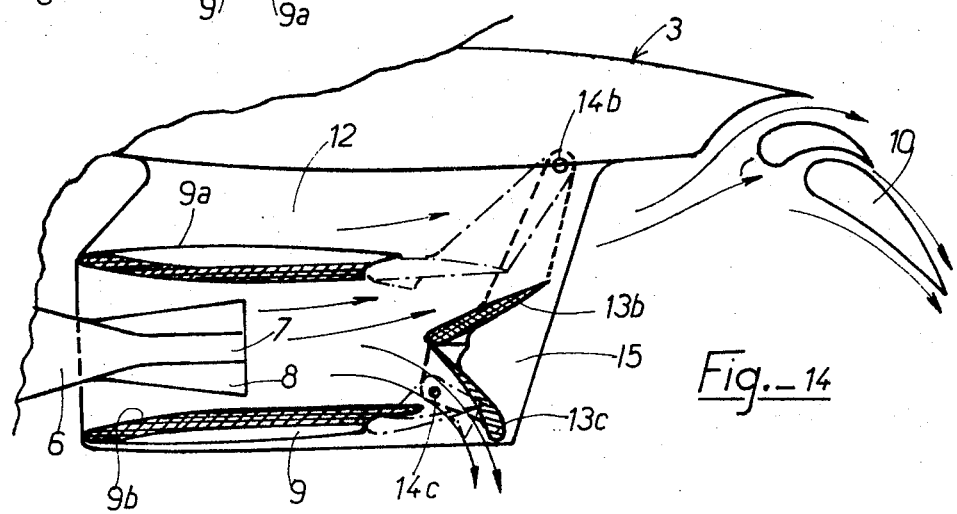
Fig.—14
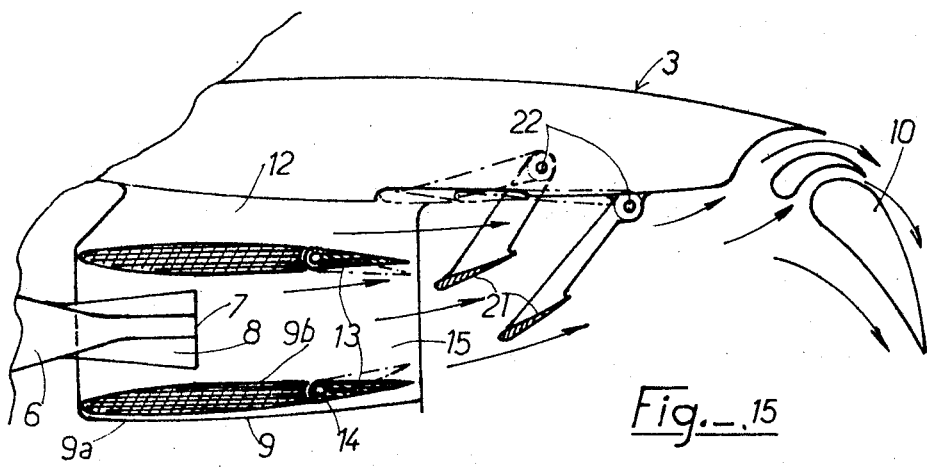
Fig.—15

AIRCRAFT HAVING AN AUXILIARY LIFT DEVICE

This invention relates to an aircraft propelled by turbojets silenced by means of flat fishtail nozzles — i.e., nozzles having a rectangular outlet cross-section, one dimension of such cross-section being definitely larger than the other — the aircraft taking off an landing with the use of auxiliary lift produced by interaction between the flattened jet stream and wings with ailerons in their trailing edge or with camber flaps, the flattened stream providing uniform auxiliary lift for the aerofoil portion concerned.

Fish-tail nozzles are familiar and are described in French Patent Nos. 1,164,692 and 1,207,634 and in GUIENNE et al., U.S. Pat. No. 3,212,700 ; these disclosures also show that fish-tail nozzles have a very good silencing feature. Also, flaps controlling the outlet of the flattened nozzle can readily and effectively be fitted to such nozzles because of their elongated rectangular shape; these flaps are adjustable and are pivoted transversely of the spread of the jet stream and can be short lengthwise of the flow.

Because of the spread of the jet stream the trailing-edge ailerons can also be short lengthwise of the flow.

Fish-tail nozzles can be combined very satisfactorily with a flat fairing open at both ends with a static pump effect. The fairing can have flaps for controlling its outlet cross-section.

According to this invention, a fish-tail nozzle, possibly in combination with a flat fairing having control flaps, is disposed below an aircraft wing undersurface and extends along the wing span in front of and near the camber ailerons so that the propelling flux leaving the nozzle (or, where applicable, the fairing) in the form of an elongated fluid vein is directed by the control flaps, when the same are in the maximum lift position, on to the camber ailerons so as to increase lift by deflecting flattened cross-section vein, the fluid flowing in the correct manner over the top surface of the camber ailerons.

Preferably, a fish-tail nozzle having a static pump effect in combination with a flat fairing is subdivided into a sequence of elementary nozzles producing a laminar stream of hot gases, and the fairing is subdivided into as many separate juxtaposed elementary ducts as there are elementary nozzles, each elementary nozzle being associated with an elementary duct to form an elementary static pump.

The following description, taken together with the accompanying exemplary non-limitative drawings, will show clearly how the invention may be carried into effect.

In the drawings:

FIG. 1 is a diagrammatic view in side elevation of an installation according to the invention in the cruising position;

FIG. 2 is a partial view of the rear portion in the position for auxiliary lift;

FIGS. 3 and 4 are very diagrammatic views of two variants of a complementary constructional detail;

FIG. 5 is a diagramming partial plan view showing a further improvement according to this invention;

FIG. 6 is a longitudinal section on the line VI—VI of FIG. 5;

FIGS. 9a, 9b and 9c are views in side elevation, plan and front elevation, respectively, of an aircraft according to this invention, and FIGS. 10 to 15 are sections similar to the section of FIG. 6 and each showing a constructional variant.

Figure 7:
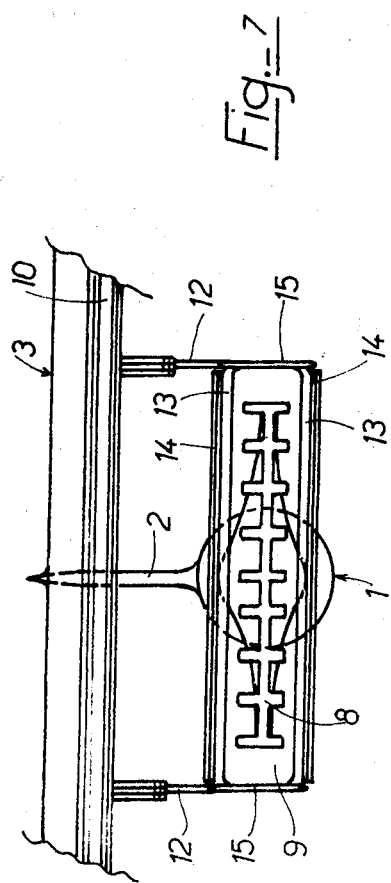
FIG. 7 is a rear elevation in the direction indicated by the arrow VII of FIG. 6.

In the embodiment shown in FIGS. 1 and 2, a turbojet engine 1 having a bladed thrust reverser 11 is pod-mounted by means of a streamlined arm 2 below and in front of an aircraft wing 3 having camber ailerons or flaps 10 on its trailing edge. The engine 1 intakes air through a front tube 4 which has, with advantage, sound-insulating sleeving and which forms a forwards extension of a pod 5. An exhaust pipe 6 for the hot gases has a flat fish-tail shape and terminates in an outlet cross-section 7 comprising a series of cruciform elements 8 through which the hot gases depart as thin lamina at right-angles to one another.

The nozzle 6 has means for deflecting the jet stream upwards towards the ailerons 10 in their auxiliary-lift position, in the manner shown in FIG. 2. To deflect the jet stream, the cruciform elements 8 are pivoted into the broken-line position in FIG. 3, to which end the elements 8 are mounted by means of a pivot 8a for pivoting around a horizontal axis. Alternatively, a deflecting blade 7a visible in FIG. 4 could be used; the blade 7a is disposed at the nozzle outlet 7 and is mounted for pivoting around a horizontal axis.

In the more elaborate embodiment shown in FIGS. 5 to 8, the fish-tail nozzle outlet cross-section 7 delivers into a flat fairing 9 which is in shape substantially oblong and which is divided into compartments by sound-insulated longitudinal partitions (not shown) so that each cruciform element 8 is disposed separately in an elementary duct of substantially rectangular cross-section. Combining thin lamina of hot gases with partitioned elementary ducts and with sound insulation of the partitions of the latter ducts leads to an appreciable reduction in the noise level; there is also an improved static-pump effect.

The ejection system also comprises flaps 13—13 which are disposed at the fairing trailing edge and which can pivot around transverse pivots 14—14 between two plane end members 15—15. The fairing 9 and its accessories are mounted below the wing 3 on shaped arms 12—12.

Figure 8:
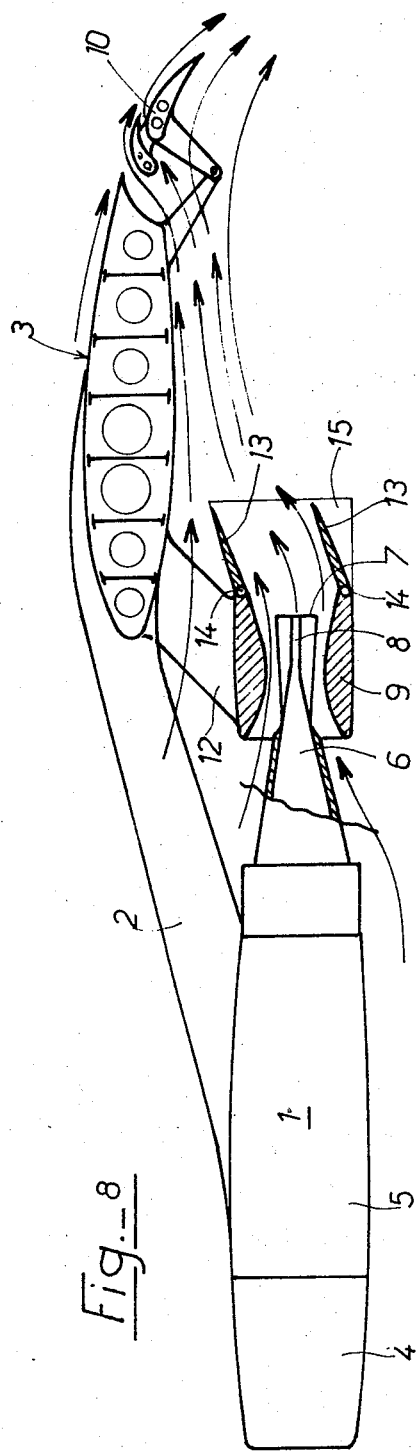
FIG. 8 is a view similar to FIG. 6 and shows the control flaps and the camber ailerons in the auxiliary-lift position.

The normal-flight configuration is shown in FIG. 6; the flaps 13—13 are disposed in extension of the fairing 9 and the ailerons 10 are in the retracted position. To increase lift, for instance, at take-off or landing, the configuration shown in FIG. 8 is used, the flaps 13—13 being pointed upwards and the ailerons 10 being brought out. The jet stream which leaves the fairing 9 and which is a homogeneous mixture of the inducing hot gases delivered by the engine turbine and the induced ambient air, is deflected upwards by the flaps 13—13 and flows over the wing undersurface, and then over the ailerons 10, as indicated by arrows.

There are several advantages in this combination of features. The jet stream from the rectangular ejection device, since it has a flattened shape, produces a considerable hypercirculation effect, for it affects a very large portion of the aerofoil surface. Because of its flat shape the jet stream is readily deflected by the flaps 13 and ailerons 10, which can be of reduced dimensions lengthwise of the flow. The jet stream leaving the fairing 9 is cooler and slower than a conventional jet stream, with a consequent improvement in the mechanical behaviour of the auxiliary-lift system at high speeds and temperature. In the event of an engine failure, the lift of the other motors can be altered rapidly by operation of the flaps to restore symmetry; clearly, a multi-jet engine aircraft of the kind shown in FIGS. 9a, 9b and 9c will have one auxiliary-lift system for each engine.

In the variants of FIGS. 10 and 11, the flat fairing 9 is not pod-mounted as in the previous embodiment but placed immediately adjacent and secured to the wing undersurface. Consequently, only a single control flap 13 is provided on that side of the fairing 9 which is remote from the wing. All the air intake into the flat fairing 9 can be from below the wing in cases in which the engine 1 is pod-mounted below the wing, as is shown in FIG. 10; if, however, the jet engine 1 is embedded in the wing, the air can be intaken from both sides of the wing in the manner shown in FIG. 11. In the latter case the nozzle 6 has a goose-neck shape since the axes of the engine 1 and fairing 9 are not in alignment with one another.

Instead of the number of flaps 13 being reduced from two to one as just described, more than two flaps could be provided, and FIG. 12 shows two sets of double flaps 13 disposed in tandem, with synchronised single actuation provided by a reciprocating actuator 20 secured to the fairing mounting arm 12.

Advantageously, the fairing is sound-insulated and can accordingly be embodied by an outer solid sheet-metal casing 9a (see FIGS. 13–15) and a perforate inner sheet-metal casing 9b shaped to bound a convergent-divergent passage, the nozzle outlet plane 7 being disposed at the throat of the latter passage. The space between the casings or walls 9a and 9b can be either filled with a sound insulant, such as mineral wool (diagrammatically shown by cross-hatchings) or left empty, in which event the space acts as a resonator, the diameter of the apertures in the wall 9b being determined in dependence upon the predominant frequency of the exhaust gas noise.

In FIG. 13, the flaps 13a–13a, which are sound-insulated like the flat fairing 9 which they follow, are rigidly secured to one another and form part of an assembly pivotally connected by a pivot 14a to the fairing support arm 12.

Referring to FIG. 14, control flaps 13b–13c mounted on pivots 14b, 14c can be pivoted towards one another like the shells of the jet stream deflectors known as wolf traps. The jet stream leaving the fairing 9 therefore divides into two fractions, one of which is directed upwards by flap 13b to provide the auxiliary lift hereinbefore referred to in cooperation with the ailerons 10, while the other fraction is directed downwardly by the flap 13c and produces a reaction thrust which adds to the aerodynamic lift. This feature is particularly suitable for shifting the thrust centre forwards.

Referring to FIG. 15, the control flaps 13—13 cooperate with retractable deflecting blades 21—21 which are mounted on pivots 22—22 and which can retract into the wing 3.

I claim:

1. An STOL aircraft having at the trailing edge of its wing a lift-augmenter flap system deflectable to lift augmenting position, and a lift-augmenter device designed for producing a fluid stream elongated in the wing span direction and directed to engage said flap system when in said lift augmenting position thereof in order to enhance lift augmentation through aerodynamic action of said fluid stream, said device comprising:

a flat fish-tail jet nozzle assembly presenting a succession of elementary nozzles spaced substantially parallel to said wing span direction and each in the form of a generally rectangular slot substantially perpendicular to said direction, and an open-ended flat ejector shroud having a forwardly facing air intake end and a rearwardly facing stream discharge end which extends below the wing undersurface at a location forward of said flap system, both said ends being of generally recrangular shape with a major side extending substantially parallel to said wing span direction, said flat ejector shroud surrounding said jet nozzle assembly and forming therewith a flat injector wherein ambient air taken in by said rectangular intake end is induced due to the entraining action of the motive gas issuing from said elementary rectangular slot-like nozzles and mixes with said gas to form said elongated fluid stream which issues from said rectangular discharge end.

2. An aircraft as claimed in claim 1, wherein said flat fish-tail jet nozzle assembly further comprises a slot-like outlet extending substantially parallel to said wing span direction and intersecting said elementary recrangular slot-like nozzles which extend substantially perpendicular thereto, whereby said jet nozzle assembly is of cruciform pattern.

3. An aircraft as claimed in claim 2, wherein said flat fish-tail jet nozzle assembly is at least in part pivotable about an axis substantially parallel to said wing span direction, whereby said assembly is effectively orientable in a plane substantially perpendicular to said wing span direction.

4. An aircraft as claimed in claim 3, wherein said flat fish-tail jet nozzle assembly is bodily pivotable about said axis.

5. An aircraft as claimed in claim 1, wherein said flat ejector shroud is substantially throughout its longitudinal extension of generally rectangular cross-section and comprises an upper wall and a lower wall opposite each other, which first converge towards each other starting from said rectangular air intake end and then diverge from each other towards said rectangular stream discharge end.

6. An aircraft as claimed in claim 5, wherein said flat fish-tail jet nozzle assembly and said flat rectangular ejector shroud are separately borne by said wing at chordwise spaced locations thereof.

7. An aircraft as claimed in claim 6, wherein each of said flat fish-tail nozzle assembly and said flat rectangular ejector shroud is pod-mounted in vertically spaced relation below said wing.

8. An aircraft as claimed in claim 6, wherein said flat rectangular ejector shroud is fast with and adjacent to said wing undersurface.

9. An aircraft as claimed in claim 8, further comprising a passage formed through said wing from the oversurface to the undersurface thereof and leading into said flat rectangular ejector shroud, whereby said flat injector sucks ambient air from said wing oversurface.

10. An aircraft as claimed in claim 5, wherein said flat rectangular ejector shroud further comprises a stream deflector vane pivotable about an axis substantially parallel to said wing span direction and fitted adjacent said rectangular stream discharge end, generally parallel to said major side thereof.

11. An aircraft as claimed in claim 10, wherein said pivotable stream deflector vane is adjustable to a feathering position causing substantially no deflection of said stream.

12. An aircraft as claimed in claim 11, wherein said pivotable stream deflector vane, when in said feathering position, forms a streamlined rear extension of at least one of said walls.

13. An aircraft as claimed in claim 12, wherein said pivotable stream deflector vane, when in said feathering position, forms a streamlined rear extension of said lower wall.

14. An aircraft as claimed in claim 12, wherein said pivotable stream deflector vane, when in said feathering position, forms a streamlined rear extension of each of said upper and lower walls.

15. An aircraft as claimed in claim 14, wherein each pivotable stream deflector vane is adjustable to a stream deflecting position in which said stream is fractionated into two parts respectively deflected upwards to engage said lift-augmenter flap system and downwards to produce lifting thrust.

16. An aircraft as claimed in claim 12, wherein said pivotable stream deflector vane is adjustable to a stream deflecting position in which it is dipped right into said stream issuing from said rectangular discharge end.

17. An aircraft as claimed in claim 12, further comprising a retractable guide blade system fitted under said wing and projectable downwards to an operative position within said stream intermediate said rectangular stream discharge end and said lift-augmenter flap system, said guide blade system being retractable into said wing.

* * * * *